Dec. 1, 1959  P. E. CAVANAGH  2,914,797
PELLET MAKING MEANS AND METHOD
Filed Sept. 25, 1956  2 Sheets-Sheet 1

INVENTOR
PATRICK E. CAVANAGH
BY: Fetherstonhaugh & Co
ATTORNEYS

Dec. 1, 1959   P. E. CAVANAGH   2,914,797
PELLET MAKING MEANS AND METHOD
Filed Sept. 25, 1956   2 Sheets-Sheet 2

INVENTOR
PATRICK E. CAVANAGH
BY: *Featherstonhaugh & Co*
ATTORNEYS

United States Patent Office 2,914,797
Patented Dec. 1, 1959

2,914,797

PELLET MAKING MEANS AND METHOD

Patrick Edgar Cavanagh, Oakville, Ontario, Canada, assignor to Ontario Research Foundation, Toronto, Ontario, Canada, a corporation Application September 25, 1956, Serial No. 611,920

4 Claims. (Cl. 18—1)

This invention relates to a method and to apparatus for making pellets of a predetermined size and moisture content from powdered material.

When the phrases "predetermined size" and "predetermined moisture content" are used, it will be understood that, about the optimum values, there is a range which is within the allowable tolerance. These ranges are therefore included within the phrase "predetermined size" or "predetermined moisture content."

The subject matter of the invention includes a method wherein pellet nuclei formed of powdered material having a moisture content higher than the predetermined amount are agitated and are rolled in powdered material having a moisture content of less than the predetermined amount, being preferably dry powdered material.

The pellet nuclei are violently agitated, which brings the excess moisture to the surface of each nucleus and also has the effect of compacting the nucleus until the spaces between the particles are capillary in nature. The excess moisture permeates the drier powdered material which accumulates about each nucleus, and as the pellet grows the violent agitation continues to provide capillary spacing among the added material and to provide moisture at the surface thereof to permeate further added material. This process continues until there is no further excess moisture in the pellet to appear at the surface. From this point no further portions of the drier material will be picked up by the pellet, and the pellet has therefore achieved a maximum size determined by the excess moisture in the nucleus. The moisture content of the nuclei and of the added material is adapted to produce the final pellet size desired, and the final pellet has a moisture content of an intermediate amount.

The subject matter of the invention deals also with apparatus for producing pellets and for assisting in the carrying out of the above method. In the apparatus a surface of conical contour, sloping downwardly toward the periphery, is spaced from a stationary overlying surface of conical contour with the spacing decreasing toward the periphery thereof and wherein the upper cone has a lesser diameter than the lower. An aperture is provided in the upper cone whereby accumulations of wet, powdered material may be dropped onto the rotating cone and the material being caught between the two cone surfaces is moved outwardly on the lower cone under the gravitational and centrifugal forces to appear from below the periphery of the upper cone as roughly spherical pellet nuclei. The spacing of the cones at the upper cone periphery is therefore equal to the desired nucleus diameter. Means are provided for bringing these nuclei into contact with powdered material as they reach the periphery of the rotating cone and to remove the resultant pellets when they reach the desired size.

The subject matter of the invention also includes the equipment for forming such pellets from such nuclei, the equipment including the said rotating cone and a stationary wall surrounding and rising above such cone periphery, a gap in said wall and preferably a wall of variable height partially closing the gap, means for supplying pellet nuclei to such rotating cone, means for supplying powdered material to the conical surface adjacent such wall and means for conveying away pellets which cross said variable height wall.

In the drawings, which illustrate embodiments of the invention:

Figure 1:
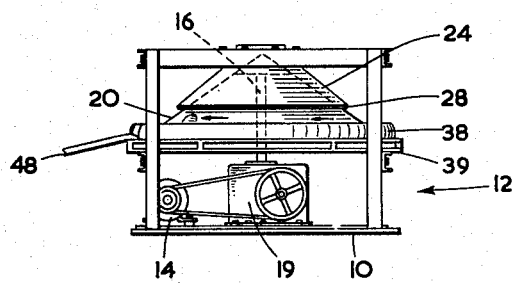
Figure 1 illustrates the mounting and drive means for the apparatus.
Figure 2:
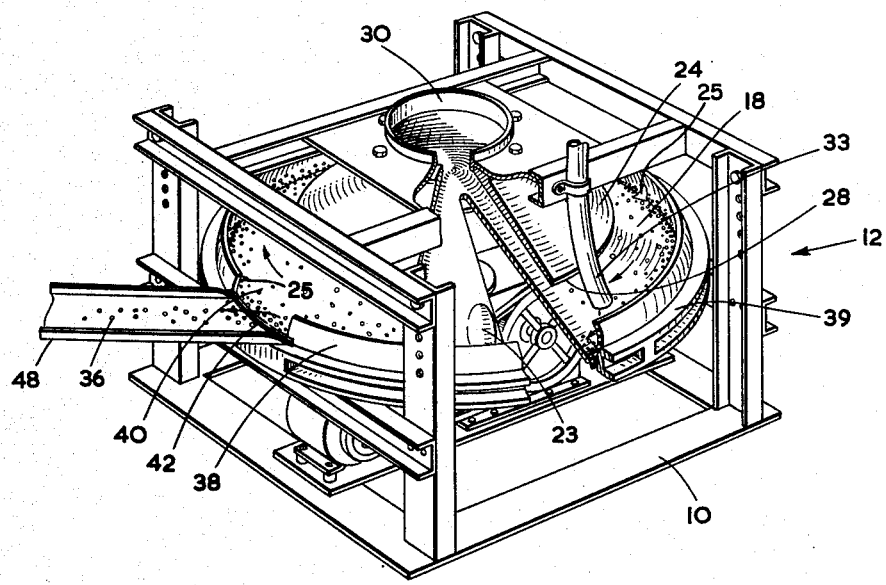
Figure 2 is a perspective view of an apparatus in operation.

Referring to Figures 1 and 2, it will be seen that a base 10 and framework 12 mount a drive motor 14 connected to drive the shaft 16 of the rotary cone 18, the cone shaft being mounted in a suitable base 19.

Figure 3:
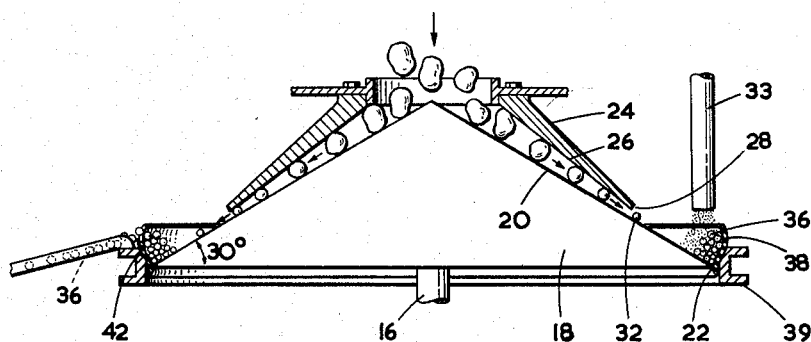
Figure 3 is a schematic side cut-away illustrating the operation of the invention.

Referring now to Figures 2 and 3, it will be seen that the cone 18 is mounted in umbrella fashion at the upper extremity of the shaft 16. The operational part of the cone 18 is the upper surface 20 sloping downwardly from the axis of rotation to the periphery 22.

Adjacent periphery 22, at spaced locations, are placed one or more irregularities such as blisters 23 on the surface 20 (here shown as a pair of diametrically opposed blisters). Also adjacent the periphery are spaced scraper knives 25 projecting upwardly from the surface 20 and pitched relative to the direction of rotation so as to deflect particles struck thereby inwardly toward the rotary axis. Preferably there is provided a pair of diametrically opposed knives quartered between the blisters 23. The cone slopes should be between 20 and 45° to the horizontal, and is preferably about 30°.

Rigidly mounted on the framework 12 is a second conical or frusto-conical member 24, whose operational element is a conical or frusto-conical surface 26 facing and spaced above the first surface 20. The upper conical member 24 is of a smaller diameter than the rotating cone 18, and the spacing between the surfaces decreases from the axis of rotation toward the periphery 28 of the upper conical member 24.

As will be seen from Figure 2, the stationary cone 24 is provided with an upper, central aperture 30, through which the material to form the pellet nuclei 32 may be added. The pellet nuclei are added in the form of wet accumulations of material of higher than the predetermined moisture content in accord with the invention.

The minimum spacing between the upper and lower surfaces 20 and 26 at the periphery of the upper cone member will determine the diameter of the pellet nuclei 32 released from beneath the periphery 28 of the latter.

The specific embodiment described herein deals with the formation of pellets 36 from magnetite, preferably ground to —100 mesh. With such material it has been found that the material moistened to the desired content for the pellet nuclei is dropped onto the rotating cone 18 in chunks somewhat larger than the maximum spacing between the surfaces 20 and 26. In the preferred embodiment the annular space between surfaces 20 and 26 decreases from one inch adjacent the aperture 30 to one-half an inch at the periphery 28 of the stationary conical member 24. The material dropped onto the rotating cone 18 for such a one inch maximum spacing is preferably, therefore, in chunks of about one and a half inch thickness. Since the straight line distance between these points is about a foot and a half, it will be seen that a taper of about one in thirty-six has been found to be satisfactory. The periphery 22 of the rotating member 18 is bounded by a wall 38 extending above the cone surface 20 at the periphery 22. The wall 38 is preferably made of rubber and is supported by a rigid ring 39 on the out-side thereof up to roughly half the height of the wall 38, the ring 39 being rigidly mounted on the frame 12.

At this point it is worth noting the significance of the cone taper. It is well known in the manufacture of spherical objects, such as ball-bearings and billiard balls, that grinding surfaces arranged at 12° to one another produce a spherical surface on an object ground between them, while grinding surfaces at other angles do not. In arranging the relative inclination of the rotating and stationary cones 18 and 24 to produce generally spherical nuclei, the 12° grinding angle was approximated. Since the pellet travels in a descending spiral between the two cones, the taper therebetween is arranged so that the angle between the paths of contact of a nucleus on the two cone surfaces 20 and 26 approximates 12°.

It will be noted that wall 38 is glued or otherwise firmly attached to ring 39 along a surface of the latter which slopes outwardly and upwardly away from the periphery 22 of the rotating cone. The wall, however, extends inwardly and downwardly a short distance from ring 39 and, if allowed to assume an unflexed attitude, would intersect the surface 20 of this cone adjacent the periphery thereof. However, the downwardly extending portion of the wall is bent further downwardly by the cone periphery 22. Since the wall is biased inwardly by the resiliency of the rubber against the periphery, a seal is formed therebetween tending to prevent the escape of materials. Thus the meeting of the cone and wall surfaces 20 and 38 provides a form of trench in which the pellets 36 may be retained. It should be noted that one side of the lower portion of the trench is formed by the wall 38 and the backing ring 39 together and the upper part by the wall 38 alone. To allow egress of the pellets 36 a gap 40 is cut in the upwardly projecting wall down to the backing 39 so that the "backed portion" of the outer wall 38 is still available to help form a shallow trench past the opening.

A spout 33 opening over the above defined trench is adapted to supply the drier, preferably completely dry, powdered material from a source of supply (not shown) in accordance with the invention.

In the pellet forming operation the pellets build up in the trench, the smaller pellets going to the bottom and the larger coming to the top. Therefore, the pellets 36 flung out of the gap 40 will be those of the larger size which reach a greater height than the shallow trench, and it will thus be seen that the control of pellet size may be assisted by the provision of a variable height wall to fill the gap 40, thus providing a trench of controllable height at the opening. There is, therefore, shown a small plate 42 of curved metal inserted in a spacing provided between the rubber wall 38 and the backing ring 39, the plate 42 being curved to the same contour as the rubber wall 38 and being controllable manually to be raised or lowered. It will be obvious, of course, that in more complex apparatus, in accordance with the invention, the variable height wall may be controlled by mechanically connected apparatus, whereby, for example, the turning of a hand wheel effects the raising or lowering of the variable height wall. The pellets therefore build up in the trough to a height where all pellets at such height are of maximum diameter, that is, there is no excess moisture to appear at the surface, so that the pellet will not further grow. The plate 42 is therefore raised to such height where the only pellets to go over the top thereof are those of such maximum diameter. Thus the adjustment of plate 42 is made to ensure that only such maximum diameter pellets are released.

In describing the operation of the apparatus and the putting into practice of the inventive method, the invention is described with relation to magnetite, such as "Old Bed" magnetite. It will be understood, however, that the invention may also be performed on any powders from which it is desired to make pellets, the various steps and apparatus dimensions being altered in quantum to suit the material used and the results desired.

In the preferred method the material to be turned to pellets is −100 mesh magnetite, such as "Old Bed" magnetite which has been ground to approximately 50% −325 mesh. A suitable mixture blends some of this material with the required percentage of moisture, which should be considerably higher than the desired final moisture content in the pellets 36. It has been found that moisture content in the output from the mixer of between 10% and 18% will be satisfactory. Accumulations of the material so moistened are applied through the aperture 30 in the stationary cone 24 to fall into the tapering annular space between the rotating and the stationary surfaces 20 and 26. As the accumulations are moved outward under gravitational and centrifugal forces, the tapering space reduces the size of the accumulations and discharges them in roughly spherical shape as pellet nuclei having the diameter of the spacing at the periphery 28 of the stationary cone 24. Once the roughly spherical nuclei are free of the periphery 28 they fall along the surface 20 toward the stationary retaining wall 38 and there act as the nuclei 32 for the pellets 36. The combination of centrifugal and gravitational force acting on the nuclei 32 and pellets 36 forces them against the stationary wall 38, and they are therefore rotated under the combined effect of the stationary wall 38 and of the moving surface 20.

The rotation of the growing pellets causes them to become spherical in shape, while the violent agitation created in the moving pellets by the blisters 23 and by the knives 25 brings the excess moisture to the surface of the growing pellets. Dry powdered material is fed into the bed of pellets 36 from a spout 33, whereby the excess moisture on the surface of each pellet is available to pick up the dry material in the trench until the excess moisture is thereby exhausted. Under the violent agitation the particles are shaken into closer proximity as the moisture is driven out, and this compacting continues to drive out the moisture until the particles are separated by capillary spacing. So also in the particle which has reached its maximum size, what was formerly excess moisture is now incorporated in capillary spaces in the pellet. The moisture in the pellet by its capillary force serves an important function in holding the pellet together, thus supplying the "wet" or "green" strength thereof.

As this process continues, the larger pellets 36 tend to come to the surface, while the smaller pellets 36 and nuclei 32 travel around and around in the bottom of the trench in contact with the powdered material and tend to build up faster, since they are in contact with other pellets 36 or nuclei 32 of small size and with added dry material. The added dry material may be dry ore, dry fuel, such as coke, or may be a binder to supply green strength. As the pellets grow in size they become almost perfectly spherical and travel around and around in the trench and the spread of moisture from the nucleus to the added dry material results in an overall pellet moisture content usually about 5% below the moisture content in the original nuclei 32.

The pellets 36 continue to pile up in the trench until they reach a greater height than the height of the adjustable wall 42, and therefore are flung over the wall 42 and are conveyed away in a suitable conveyor such as the downwardly sloping trough 48.

It has been found that the size of the pellets 36 discharged is very uniform. The more rapid the speed of the revolving cone 18, the smaller will be the pellets 36 discharged into the trough 48, since the centrifugal force will be greater and will tend to fling the pellets 36 out sooner. The height of the discharge wall 42 will also control pellet size, since the lower the wall level, the smaller will be the built up size of the pellets 36 when they reach the wall height. Preferably, however, the wall 42 is at a sufficient height that the pellets will have reached maximum size before reaching a height to cross such wall.

What I claim as my invention is:

1. Means for making pellets of predetermined diameter comprising; a rotating member having a first surface of conical contour sloping toward the periphery thereof; a second stationary surface of conical contour, spaced above said first surface to provide spacing between the two surfaces and of smaller diameter than said first surface leaving exposed a portion of said first surface, said spacing tapering toward the periphery of said second surface and the minimum intersurface distance at the periphery of said second surface being less than said predetermined diameter; means for supplying relatively moist pellet forming material to said space in units larger than the minimum spacing of said surfaces; means for adding relatively dry pellet forming material to said exposed portion and a stationary wall surrounding and rising above the periphery of said rotating member.

2. Means as claimed in claim 1, wherein said first surface is provided with irregularities.

3. Means for making pellets as claimed in claim 1, wherein a gap is provided in the upper portion of said wall.

4. Means for making pellets as claimed in claim 3, wherein a variable height wall partially vertically closes said gap.

References Cited in the file of this patent

UNITED STATES PATENTS

| | | |
|---|---|---|
| 317,359 | Hodge | May 5, 1885 |
| 1,994,718 | Lellep | Mar. 19, 1935 |
| 2,015,381 | Harding et al. | Sept. 24, 1935 |
| 2,035,845 | Stanton | Mar. 31, 1936 |
| 2,603,832 | Clark et al. | July 22, 1952 |
| 2,627,457 | Kerley | Feb. 3, 1953 |
| 2,805,141 | Apuli | Sept. 3, 1957 |
| 2,809,534 | Haley et al. | Sept. 24, 1957 |

FOREIGN PATENTS

| | | |
|---|---|---|
| 915,072 | Germany | July 15, 1954 |